United States Patent [19]

Goldstein et al.

[11] 4,354,870
[45] Oct. 19, 1982

[54] METALS BENEFICIATION PROCESS

[75] Inventors: Theodore P. Goldstein, Yardley, Pa.; Louis D. Rollmann, Princeton, N.J.

[73] Assignee: Mobil Oil Corporation, New York, N.Y.

[21] Appl. No.: 311,581

[22] Filed: Oct. 15, 1981

Related U.S. Application Data

[63] Continuation-in-part of Ser. No. 225,158, Jan. 15, 1981, abandoned.

[51] Int. Cl.$^3$ .................. C22B 3/00; C22B 11/04; C01F 7/28
[52] U.S. Cl. .................. 75/108; 75/118 R; 75/121; 423/111
[58] Field of Search .................. 423/1, 22, 48, 321 R, 423/561 R, 111; 209/5; 210/273; 252/324, 450; 75/0.5, 108, 118 R, 121; 501/146, 149; 106/288 B

[56] References Cited

U.S. PATENT DOCUMENTS 4,127,639 11/1978 Piret et al. .................. 423/48

FOREIGN PATENT DOCUMENTS 728743 4/1975 United Kingdom .................. 423/1
554209 7/1977 U.S.S.R. .................. 423/561 R

*Primary Examiner*—O. R. Vertiz
*Assistant Examiner*—Margaret B. Medley
*Attorney, Agent, or Firm*—Charles A. Huggett; Michael G. Gilman; Claude E. Setliff

[57] ABSTRACT

A process for settling sedimentary materials wherein aqueous suspensions thereof are treated with $H_2S$ as a means for separating clays containing metals associated therewith.

6 Claims, No Drawings

METALS BENEFICIATION PROCESS

CROSS REFERENCE TO RELATED APPLICATIONS

This application is a continuation-in-part of U.S. Application Ser. No. 225,158, filed Jan. 15, 1981, now abandoned.

BACKGROUND OF THE INVENTION

1. Field of the Invention

The invention is directed to a process of separating clays, for example those containing metal values, from various slurries and aqueous suspensions of such clays by treating them with $H_2S$.

2. Discussion of the Prior Art

Sedimentation of clay-containing slimes is conventionally effected by addition of a flocculant, typically an organic polymer. Thus it was surprising to find that contact with $H_2S$ can have a similar effect. This is important because not only does it provide a way to separate clays, such as phosphate slimes and the like from oggolmerates, but it also indirectly provides a way to gain easier access to metals that are or may be attached to the clay. It should be emphasized that this type of metal removal is not the same as the known $H_2S$ treatment of certain media to remove metals present in compound form by precipitation as the sulfide. This is known, for example, from U.S. Pat. No. 1,787,192, in which various elements are precipitated from dilute phosphoric acid with $H_2S$; U.S. Pat. No. 4,127,639, which discloses the selective precipitation with $H_2S$ of silver, from aqueous lead solutions obtained by hot chloride leaching of residues containing lead and silver; and Russian Pat. No. 554209, teaching the recovery with $H_2S$ of alkaline earth metals from sludge arising from aqueous leaching of melts of their metal sulfides.

SUMMARY OF THE INVENTION

In accordance with the present invention, there is provided a process of recovering a metal-bearing clay, said metal being platinum, palladium or gold, from an aqueous suspension comprising said metal-bearing clay, by contacting said suspension with $H_2S$.

DESCRIPTION OF SPECIFIC EMBODIMENTS

This invention is generally adaptable to any clay-containing sedimentary materials, from whatever source. As mentioned hereinabove the process of the present invention is particularly suited to phosphate slimes and to other clays having, for example, platinum, palladium, or gold associated therewith. Clays to which the method embodied herein is highly adaptable include, but are not limited to, clays such as montmorillonite clays, as for example, bentonite, attapulgite, hectorite, illite saponite, sepiolite, luotite, vermiculite, fullers earth and the like.

Normally, the clays (e.g., slimes from phosphate or other mining operations) are in the presence of other substances in the aqueous suspension. By contacting the suspension with $H_2S$, the clay portion is selectively precipitated, thus providing an unexpected method for handling the difficult slimes problem generally encountered in the aqueous beneficiation of minerals.

As is disclosed in journals and in such books as "An Introduction to Clay Colloid Chemistry", Interscience Publishers (1963), it is well known that free metal that comes into contact with clay may become attached thereto as a negative metal sol. It is also known that the metal is always associated with the clay and not with other members of the agglomerate. Thus, another advantage gained by the $H_2S$ treatment of this invention is that the metal present will be substantially quantitatively removed with the clay, making it easier to recover by any available means.

The process is usually carried out in the following manner: $H_2S$ is bubbled into an aqueous suspension comprising a particulate clay, or fine grained sedimentary material, at a convenient flow rate sufficient to saturate the suspension in about 1 to 30 minutes, preferably under ambient conditions of temperature and pressure. However, higher temperatures and pressure may be resorted to if it is thought to be desirous.

This is obviously not a critical feature of the invention, as the temperature and pressure can be selected easily by one skilled in this art. It usually takes from less than 0.1 to 10 hours for the clay containing the metal values to settle as sediments from the aqueous solution as a result of the $H_2S$ treatment. The amount of time for any particular treatment depends upon the interrelationship of the overall process conditions. Any treatment chosen, however, will produce significantly enhanced sedimentation rates.

It is contemplated that, upon treatment of the aqueous suspension with $H_2S$, a portion of the metal associated with the clay may become detached. Should it do so, the metal may form as a colloidal dispersion in the aqueous medium, producing a "solution" not unlike colloidal metal solutions, like Lange's Colloidal Gold Solution, that are commercially available.

The following examples are offered as illustrations of the present invention and are not intended as limitations.

EXAMPLE 1

$H_2S$ gas was bubbled into an aqueous suspension of 0.04 g. montmorillonite clay, containing less than 100 ppm colloidal gold, in 5.2 g. water. Within minutes the color of the solid changed from pink to purple. The mixture was heated to about 30° C. for 5 minutes and removed from the heat. The dark purple solid rapidly settled. A blank, which was not contacted with $H_2S$, remained pink and showed no signs of settling.

EXAMPLE 2

The procedures of Example 1 was repeated using 0.03 g. $Na_2S.9H_2O$ in place of the $H_2S$. After 2 hours a perceptible color change, from pink to purple, had occurred but with almost no settling of the slime.

EXAMPLE 3

The procedure of Example 1 was repeated using 2 drops concentrated HCl in place of the $H_2S$. After 2 hours no color change and only minimal settling was observed.

The examples clearly demonstrate that the method embodied herein is an efficient and inexpensive method of separating clay from aqueous suspensions of clay-containing material. Furthermore, such separation provides easier recovery of metal associated with the clay.

Examples 2 and 3 also serve to illustrate that use of $H_2S$ in accordance with the present process is essential. This is to say, the soluble alkali metal sulfides, in contrast to the prior art precipitation of metal ions, do not operate to precipitate or coagulate slimes or other clay particles.

We claim:

1. A process for recovering a clay from an aqueous suspension comprising same, the process comprising contacting said aqueous suspension with $H_2S$ for a time sufficient to selectively precipitate the clay portion, said clay having platinum, palladium or gold associated therewith.

2. The procees of claim 1 wherein said treatment is achieved by bubbling $H_2S$ into the aqueous suspension at a flow rate just sufficient to saturate the suspension therewith under ambient conditions of temperature and pressure.

3. The process of claim 1 wherein the aqueous suspension comprises a slime or slurry-containing phosphate and platinum, palladium or gold values.

4. The process of claim 1 wherein the clay is a particulate clay.

5. The process of claim 1 wherein said aqueous suspension comprises a montmorillonite clay containing a colloidal suspension of gold.

6. The process of claims 1 and 5 wherein, upon treatment with $H_2S$, precipitation of the clay is accompanied by detachment of the metal therefrom and the formation of colloidal suspension thereof in water.

* * * * *